US012441966B2

(12) United States Patent
Al-Bayati et al.

(10) Patent No.: US 12,441,966 B2
(45) Date of Patent: Oct. 14, 2025

(54) PACKAGE COMPRISING DETERGENT COMPOSITIONS

(71) Applicant: Reckitt Benckiser Finish B.V., Hoofddorp (NL)

(72) Inventors: Alias Younis Al-Bayati, Heidelberg (DE); Francesc Ardite Ayats, Barcelona (ES); Ralf Hofsäss, Heidelberg (DE); Jörg Peter Pflug, Heidelberg (DE); Torsten Roth, Heidelberg (DE); Claudia Schmaelzle, Heidelberg (DE); Christian Schneeweiss, Heidelberg (DE); Boris Seitz, Heidelberg (DE)

(73) Assignee: Reckitt Benckiser Finish B.V. (NL)

( * ) Notice: Subject to any disclaimer, the term of this patent is extended or adjusted under 35 U.S.C. 154(b) by 750 days.

(21) Appl. No.: 17/509,932

(22) Filed: Oct. 25, 2021

(65) Prior Publication Data

US 2023/0126126 A1 Apr. 27, 2023

(51) Int. Cl.

*C11D 3/02* (2006.01)
*C11D 3/37* (2006.01)
*C11D 3/395* (2006.01)
*C11D 17/00* (2006.01)
*C11D 17/04* (2006.01)

(52) U.S. Cl.

CPC .......... *C11D 17/045* (2013.01); *C11D 3/3753* (2013.01); *C11D 17/043* (2013.01); *C11D 17/044* (2013.01); *C11D 2111/14* (2024.01)

(58) Field of Classification Search

CPC .... C11D 17/043; C11D 17/044; C11D 17/045
USPC .......................................... 510/296, 439, 475
See application file for complete search history.

(56) References Cited

U.S. PATENT DOCUMENTS

| | | | | |
|---|---|---|---|---|
| 10,183,794 | B2 * | 1/2019 | Souter | B65D 81/3261 |
| 2017/0029747 | A1 * | 2/2017 | Depoot | C11D 3/30 |
| 2017/0166846 | A1 * | 6/2017 | Boutique | C11D 17/043 |

FOREIGN PATENT DOCUMENTS

| | | | | |
|---|---|---|---|---|
| CA | 2970575 A1 * | 8/2017 | | B65D 65/46 |
| EP | 1375637 A1 * | 1/2004 | | C11D 17/042 |
| EP | 3205600 A1 * | 8/2017 | | B65D 25/205 |
| EP | 3205601 A1 * | 8/2017 | | B65D 65/46 |
| WO | WO-2017131799 A1 * | 8/2017 | | C11D 17/04 |
| WO | WO-2022253728 A1 * | 12/2022 | | C11D 1/72 |

OTHER PUBLICATIONS

Automatic Dishwashing Detergent—Label displaying SCU-01_Back_label_150×115 as used in connection with consumer testing beginning May 13, 2021.
Automatic Dishwashing Detergent—Label displaying SCU-01_Front_label_150×60 as used in connection with consumer testing beginning May 13, 2021.
Automatic Dishwashing Detergent—Label displaying SCU-02_Back_label_150×115 as used in connection with consumer testing beginning May 13, 2021.
Automatic Dishwashing Detergent—Label displaying SCU-02_Front_labe_150×60 as used in connection with consumer testing beginning May 13, 2021.
Automatic Dishwashing Detergent—Label displaying SCU-04_Back_label_150×115 as used in connection with consumer testing beginning May 13, 2021.
Automatic Dishwashing Detergent—Label displaying SCU-04_Front_label_150×60 as used in connection with consumer testing beginning May 13, 2021.
Screener HUTS Supersonic US as used in connection with consumer testing beginning May 13, 2021.
Placement Letter_LFP01_US as used in connection with consumer testing beginning May 13, 2021.
Questionnaire—Supersonic US 5-7 days questionnaire—2021 (316.405551) as used in connection with consumer testing beginning May 13, 2021.
Questionnaire—Supersonic US HUT 4 weeks questionnaire—2021 (316.405551) as used in connection with consumer testing beginning May 13, 2021.
Instruction_Waterhardness Measurement as used in connection with consumer testing beginning May 13, 2021.
Documentation of consumer testing beginning May 13, 2021.

* cited by examiner

*Primary Examiner* — Gregory R Delcotto
(74) *Attorney, Agent, or Firm* — Lerner David LLP

(57) ABSTRACT

A package for an automatic dishwashing cycle, the package comprising at least one detergent composition in the form of a solid and at least one detergent composition in the form of a gel, wherein the weight ratio of the total amount of solid detergent composition to the total amount of gel detergent composition is between about 1.60:1 and about 3.00:1.

22 Claims, No Drawings

PACKAGE COMPRISING DETERGENT COMPOSITIONS

TECHNICAL FIELD OF THE INVENTION

The present invention relates to a package comprising detergent compositions. The invention further relates to methods of washing kitchenware or tableware, and the use of a package comprising detergent compositions to treat kitchenware or tableware.

BACKGROUND TO THE INVENTION

Packages comprising detergent compositions, in particular detergent compositions for an automatic dishwashing cycle, typically comprise a solid detergent composition and at least one liquid detergent composition. Conventionally, each of the solid detergent composition and the at least one liquid detergent composition comprise one or more cleaning actives, for example a builder, surfactant, alkalinity source, acidity source, enzyme, polymer, anti-corrosion agent, bleaching agent or care agent, or a mixture thereof.

Attempts have been made to improve the cleaning performance of such packages by incorporating one or more cleaning actives in the form of a gel composition or an additional liquid composition into the package. The gel composition and the additional liquid composition allows for additional cleaning actives, which may be the same or different to the cleaning actives in the original solid and liquid compositions, to be contained within the package.

SUMMARY OF THE INVENTION

According to a first aspect of the invention, there is provided a package for an automatic dishwashing cycle, the package comprising at least one detergent composition in the form of a solid and at least one detergent composition in the form of a gel, wherein the weight ratio of the total amount of solid detergent composition to the total amount of gel detergent composition is between about 1.60:1 and about 3.00:1.

The package is useful in any individual stage or multiple stages of the dishwashing cycle of an automatic dishwasher. In this specification the term 'dishwashing cycle' means the entire dishwashing operation, including a main wash and a rinse stage, a pre-wash, an intermediate stage, and any additional cleaning or rinsing stages.

By the term 'detergent composition', it is meant a composition comprising one or more cleaning actives suitable for a dishwashing cycle. A detergent composition may comprise at least one cleaning active selected from the group comprising a builder, co-builder, surfactant, alkalinity source, acidity source, enzyme, polymer, anti-corrosion agent, bleaching agent, perfume, colourant or care agent, or a mixture thereof.

By the term 'solid detergent composition', it is meant a detergent composition in solid form, including, for example, a powdered solid, a tablet, a coated granule or a co-granule. The powdered solid may be a compressed powder or a non-compressed powder, or a mixture thereof.

Gels are generally defined as a non-fluid colloidal network or polymer network that is expanded throughout its whole volume by a fluid, with hydrogels having water as the expanding or swelling agent. Herein, the term gel is not limited to a strictly colloidal composition and for the purposes of the invention the term gel may comprise a gel-like thickened liquid. The term 'gel-like' may refer to a combination of liquid and solid, or a suspension of solid-in-liquid, that has the appearance and/or consistency of a gel. A gel or gel-like material may have a viscosity at low shear rates (i.e. 0.1 $s^{-1}$) of greater than 3.5 Pa·s at 25° C. and atmospheric pressure; for example as recorded on a research rheometer with a Brookfield V73 vane in a small concentric cylinder system.

Surprisingly, it has been found that a package comprising at least one detergent composition in the form of a solid and at least one detergent composition in the form of a gel, wherein the weight ratio of the total amount of solid detergent composition to the total amount of gel detergent composition is between about 1.60:1 and about 3.00:1, provides a superior wash performance, including shine performance, such as glass filming and cutlery filming, and cleaning performance, such as tea-stain bleach performance, compared to a package comprising a total amount of solid detergent composition to a total amount of gel detergent composition in a weight ratio of less than about 1.60:1, for example between about 1.30:1 and about 1.50:1.

In addition to tea-stain bleach performance, the package according to the invention provides superior cleaning performance in respect of crème brulée-stain bleach performance, milk skin-stain bleach performance, minced meat-stain bleach performance, pasta-stain bleach performance, tea-with-milk-stain bleach performance, starch mix-stain bleach performance and egg yolk-stain bleach performance.

It is known to attempt to increase the wash performance of a package comprising at least one detergent composition by increasing the quantity of cleaning actives in the package. This may be done, for example, by incorporating an additional solid or gel detergent composition comprising one or more cleaning actives into the package, or by increasing the quantity of cleaning actives in an already present solid or gel detergent composition. However, disadvantageously, in each instance, the use of a greater quantity of cleaning actives and possibly more complex packaging techniques to incorporate additional compositions into a package, increases the cost of manufacturing such packages, and the cost will, in many cases, be passed on to the consumer.

Advantageously, the invention according to the first aspect provides a package which provides a superior wash performance compared to that of known detergent packages comprising at least one solid detergent composition and at least one gel detergent composition by optimisation of the weight ratio of the total amount of solid detergent composition and the total amount of gel detergent composition while using similar, or at least not significantly increased, quantities of cleaning actives in the package. Beneficially, this means that a package according to the invention is manufactured at a similar cost to that of known packages comprising at least one solid detergent composition and at least one gel detergent composition, while providing a superior wash performance. The package according to the invention is, therefore, more cost effective than known packages comprising solid and gel detergent compositions in respect of cost of manufacture and quality of wash performance.

In known packages comprising at least one solid detergent composition and at least one gel detergent composition, where increased quantities of cleaning actives are used to enhance wash performance, the environmental impact of manufacturing and using such packages is increased because the cleaning actives used may not be substantially biodegradable or may be toxic to aquatic organisms.

However, advantageously, as the superior wash performance of the invention is achieved by using similar, or at least not substantially increased, quantities of cleaning actives, the advantages of the package according to the invention are achieved without an increased detrimental environmental impact. This also provides an advantage with respect to the marketing of the package of the invention.

Further, the advantages of the invention are realised through a surprising weight ratio of the total amount of solid detergent composition and the total amount of gel detergent composition. As such, the package according to the invention achieves its advantages without the need to use new active ingredients that may be expensive to manufacture, have a detrimental environmental impact and/or may have been the result of a significant and expensive research project.

The weight ratio is calculated by dividing the weight of the total amount of solid detergent composition by the weight of the total amount of gel detergent composition.

The weight ratio of the total amount of solid detergent composition to the total amount of gel detergent composition may be between about 1.65:1 and about 3.00:1, between about 1.70:1 and about 2.98:1, between about 1.90:1 and about 2.96:1, between about 2.00:1 and about 2.94:1, between about 2.10:1 and about 2.93:1, between about 2.20:1 and about 2.92:1, between about 2.30:1 and about 2.91:1, between about 2.40:1 and about 2.90:1, between about 2.50:1 and about 2.89:1, between about 2.60:1 and about 2.88:1, between about 2.65:1 and about 2.87:1, between about 2.70:1 and about 2.86:1, between about 2.75:1 and about 2.85:1, between about 2.80:1 and about 2.84:1, or between about 2.82:1 and about 2.84:1, or about 2.83:1.

The weight ratio of the total amount of solid detergent composition to the total amount of gel detergent composition may be at least about 1.60:1, about 1.65:1, about 1.70:1, about 1.75:1, about 1.80:1, about 1.85:1, about 1.90:1, about 1.95:1, about 2.00:1, about 2.05:1, about 2.10:1, about 2.15:1, about 2.20:1, about 2.25:1, about 2.30:1, about 2.35:1, about 2.40:1, about 2.45:1, about 2.50:1, about 2.55:1, about 2.58:1, about 2.60:1, about 2.61:1, about 2.62:1, about 2.64:1, about 2.66:1, about 2.68:1, about 2.72:1, about 2.74:1, about 2.76:1, about 2.78:1, about 2.80:1, about 2.82:1, about 2.83:1, about 2.84:1, about 2.86:1, about 2.88:1, about 2.90:1, about 2.92:1, about 2.94:1, about 2.96:1, about 2.98:1, or at least about 3.00:1.

The weight ratio of the total amount of solid detergent composition to the total amount of gel detergent composition may be no more than about 1.62:1, about 1.65:1, about 1.70:1, about 1.75:1, about 1.80:1, about 1.85:1, about 1.90:1, about 1.95:1, about 2.00:1, about 2.05:1, about 2.10:1, about 2.15:1, about 2.20:1, about 2.25:1, about 2.30:1, about 2.35:1, about 2.40:1, about 2.45:1, about 2.50:1, about 2.55:1, about 2.58:1, about 2.60:1, about 2.61:1, about 2.62:1, about 2.64:1, about 2.66:1, about 2.68:1, about 2.72:1, about 2.74:1, about 2.76:1, about 2.78:1, about 2.80:1, about 2.82:1, about 2.83:1, about 2.84:1, about 2.86:1, about 2.88:1, about 2.90:1, about 2.92:1, about 2.94:1, about 2.96:1, about 2.98:1, or no more than about 3.00:1.

The package may be a multi-compartment package. The multi-compartment package may comprise two or more, three or more, four or more, five or more, or six or more separated compartments. Each of the compartments may be arranged side-by-side, concentrically, as sectors of a circle or in any suitable random or organised pattern. Within each compartment may be located at least one solid detergent composition or at least one gel detergent composition. The at least one solid detergent composition may be located in a different compartment to that of the at least one gel detergent composition.

Beneficially, a multi-compartment package allows detergent compositions of different forms (i.e. solid form and gel form) to be located within different compartments of the same package. Such a package is aesthetically more appealing to consumers, is easier to handle by consumers and prevents any unwanted side reactions between the at least one solid detergent composition and the at least one gel detergent composition during storage, prior to use.

The multi-compartment package may comprise at least a first compartment and a second compartment. The at least one solid detergent composition may be located within the first compartment and the at least one gel detergent composition may be located within the second compartment. For example, the first compartment may comprise a detergent composition in the form of a compressed powdered solid; and the second compartment may comprise a detergent composition in the form of a gel.

The at least one detergent composition in the form of a gel may comprise a suspension of a powder or granules. The powder or granules may comprise one or more cleaning actives.

The at least one solid detergent composition may be present in an amount of at least about 56 wt. %, about 58 wt. %, about 60 wt. %, about 62 wt. %, about 64 wt. %, about 66 wt. %, about 68 wt. %, about 70 wt. %, about 72 wt. %, about 74 wt. %, about 76 wt. %, about 78 wt. %, about 80 wt. %, about 82 wt. % or at least about 85 wt. %, based on the total weight of the package.

The at least one solid detergent composition may be present in an amount of between about 56 and about 85 wt. %, between about 58 and about 82 wt. %, between about 60 and about 80 wt. %, between about 62 and about 78 wt. %, between about 64 and about 76 wt. %, between about 66 and about 74 wt. %, between about 68 and about 72 wt. %, between about 69 and about 71 wt. %, or about 70 wt. %, based on the total weight of the package.

The at least one gel detergent composition may be present in an amount of no more than about 36 wt. %, about 34 wt. %, about 32 wt. %, about 30 wt. %, about 28 wt. %, about 26 wt. %, about 24 wt. %, about 22 wt. %, about 20 wt. %, about 18 wt. %, about 16 wt. %, about 14 wt. %, about 12 wt. %, or no more than about 10 wt. %, based on the total weight of the package.

The at least one gel detergent composition may be present in an amount of at least about 6 wt. %, about 8 wt. %, about 10 wt. %, about 12 wt. %, about 14 wt. %, about 16 wt. %, about 18 wt. %, about 20 wt. %, about 22 wt. %, about 24 wt. %, about 26 wt. %, about 28 wt. %, about 30 wt. %, about 32 wt. %, about 34 wt. %, about 36 wt. %, about 38 wt. %, about 40 wt. %, about 42 wt. %, about 44 wt. %, about 46 wt. %, about 48 wt. %, or at least about 50 wt. %, based on the total weight of the package.

The at least one gel detergent composition may be present in the package in an amount of at least about 0.5 g, about 1.0 g, about 1.5 g, about 2.0 g, about 2.5 g, about 3.0 g, about 3.5 g, about 4.0 g, about 4.5 g, or at least about 5.0 g. The detergent composition in the form of a gel may be present in the package in an amount of no more than about 6.0 g, about 5.5 g, about 5.0 g, about 4.5 g, about 4.0 g, about 3.5 g, about 3.0 g, about 2.5 g, about 2.0 g, about 1.5 g, or no more than about 1.0 g.

The at least one solid detergent composition may comprise at least one cleaning active selected from the group comprising a builder, co-builder, surfactant, alkalinity source, acidity source, enzyme, polymer, anti-corrosion agent, bleaching agent, perfume, colourant or care agent, or a mixture thereof.

The at least one solid detergent composition may comprise a builder in an amount of at least about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, or at least about 25 wt. %, based on the total weight of the at least one solid detergent composition.

The builder may be at least one builder selected from the group comprising hydroxycarboxylates (such as a citrate salt, for example trisodium citrate, which may be anhydrous), aminocarboxylates (such as methyl glycine diacetic acid (MGDA), or N,N-dicarboxymethyl glutamic acid (GLDA), dicarboxylic acid amines (such as iminodisuccinic acid (IDS) and/or phosphates (such as tripolyphosphate), or the salts thereof, or mixtures thereof.

The at least one solid detergent composition may be free, or substantially free, of any builder.

The at least one solid detergent composition may comprise a bleaching agent in an amount of at least about 4 wt. %, about 6 wt. %, about 8 wt. %, about 10 wt. %, about 12 wt. %, about 14 wt. %, about 16 wt. %, about 18 wt. %, about 20 wt. %, about 22 wt. %, about 24 wt. %, about 26 wt. %, about 28 wt. %, or at least about 30 wt. %, based on the total weight of the at least one solid detergent composition.

The at least one solid detergent composition may comprise a bleaching agent in an amount of at least about 2 wt. %, about 4 wt. %, about 6 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, or at least about 20 wt. %, based on the total weight of the package.

The bleaching agent may be at least one bleaching agent selected from the group comprising a percarbonate, for example coated sodium percarbonate or uncoated sodium percarbonate, tetraacetylethylenediamine (TAED), a manganese complex comprising triazacyclononane (TACN), or any derivatives of a TACN ligand, for example 1,4,7-trimethyl-TACN, or manganese oxalate, manganese acetate or a dinuclear manganese complex, for example a dinuclear manganese complex comprising TACN or any derivatives of a TACN ligand, for example 1,4,7-trimethyl-TACN, or mixtures thereof.

The at least one solid detergent composition may comprise a bleach system. The bleach system may comprise one or more bleaching agents, one or more bleach activators and one or more bleach catalysts. The one or more bleaching agents may be selected from the group comprising a percarbonate, for example coated sodium percarbonate or uncoated sodium percarbonate. The one or more bleach activators may be tetraacetylethylenediamine (TAED). The one or more bleach catalyst may be a manganese complex comprising triazacyclononane (TACN), or any derivatives of a TACN ligand, for example 1,4,7-trimethyl-TACN, or manganese oxalate, manganese acetate or a dinuclear manganese complex, for example a dinuclear manganese complex comprising TACN or any derivatives of a TACN ligand, for example 1,4,7-trimethyl-TACN, or mixtures thereof.

The at least one gel detergent composition may comprise at least one cleaning active selected from the group comprising a builder, co-builder, surfactant, alkalinity source, acidity source, enzyme, polymer, anti-corrosion agent, bleaching agent, perfume, colourant or care agent, or a mixture thereof. Each cleaning active may be present in amounts as described above for the same cleaning active present in any solid detergent composition, and may be selected from the same groups of ingredients.

The at least one gel detergent composition may comprise a builder in an amount of at least about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, or at least about 25 wt. %, based on the total weight of the at least one gel detergent composition.

The builder may be at least one builder selected from the group comprising hydroxycarboxylates (such as a citrate salt, for example trisodium citrate, which may be anhydrous), aminocarboxylates (such as methyl glycine diacetic acid (MGDA), or N,N-dicarboxymethyl glutamic acid (GLDA), dicarboxylic acid amines (such as iminodisuccinic acid (IDS) and/or phosphates (such as tripolyphosphate), or the salts thereof, or mixtures thereof.

The at least one gel detergent composition may be free, or substantially free, of any builder.

The package may further comprise at least one detergent composition in the form of a liquid.

In some embodiments, the package may be in form of a multi-compartment package and may comprise at least a first compartment, a second compartment and a third compartment. The at least one solid detergent composition may be located within the first compartment, the at least one gel detergent composition may be located within the second compartment and an at least one liquid detergent composition may be located within the third compartment.

Advantageously, at least one solid detergent composition located in a first compartment, at least one gel detergent composition located in a second compartment and at least one liquid detergent composition located in a third compartment provides for a tailored package comprising three substantially different compositions which differ in handling and chemical properties, for example their rheological profile, therefore, allowing for unique dissolution profiles of the detergent compositions located within the respective compartments.

The weight ratio of the total amount of solid detergent composition to the total amount of gel detergent composition plus the total amount of liquid detergent composition may be at least about 1.37:1.

Surprisingly, it has been found that a multi-compartment package comprising at least one solid detergent composition, at least one gel detergent composition and at least one liquid detergent composition, each in separate compartments, wherein the weight ratio of the total amount of solid detergent composition to the total amount of gel detergent composition plus the total amount of liquid detergent composition is at least about 1.37:1, provides a superior, wash performance, including shine performance and cleaning performance, such as tea-stain bleach performance, compared to a package comprising at least one solid detergent composition, at least one gel detergent composition and at least one liquid detergent composition in a weight ratio of total amount of solid detergent composition to total amount of gel detergent composition plus total amount of liquid detergent composition of less than about 1.37:1.

The weight ratio of the total amount of solid detergent composition to the total amount of gel detergent composition plus the total amount of liquid detergent composition may be between about 1.38:1 and about 3.00:1, between about 1.40:1 and about 2.96:1, between about 1.50:1 and about 2.94:1, between about 1.60:1 and about 2.92:1, between about 1.70:1 and about 2.90:1, between about 1.80:1 and about 2.88:1, between about 1.90:1 and about 2.86:1, between about 2.00:1 and about 2.84:1, between about 2.10:1 and about 2.82:1, between about 2.20:1 and about 2.80:1, between about 2.30:1 and about 2.78:1, between about 2.40:1 and about 2.76:1, between about 2.45:1 and about 2.75:1, between about 2.50:1 and about 2.74:1, between about 2.55:1 and about 2.73:1, between about 2.60:1 and about 2.72:1, between about 2.62:1 and about 2.71:1, between about 2.64:1 and about 2.70:1, between about 2.66:1 and about 2.69:1, or about 2.68:1.

The weight ratio of the total amount of solid detergent composition to the total amount of gel detergent composition plus the total amount of liquid detergent composition may be at least about 1.38:1, about 1.40:1, about 1.45:1, about 1.50:1, about 1.55:1, about 1.60:1, about 1.65:1, about 1.70:1, about 1.75:1, about 1.80:1, about 1.85:1, about 1.90:1, about 1.95:1, about 2.00:1, about 2.05:1, about 2.10:1, about 2.15:1, about 2.20:1, about 2.25:1, about 2.30:1, about 2.35:1, about 2.40:1, about 2.45:1, about 2.50:1, about 2.55:1, about 2.58:1, about 2.60:1, about 2.61:1, about 2.62:1, about 2.64:1, about 2.66:1, about 2.68:1, about 2.72:1, about 2.74:1, about 2.76:1, about 2.78:1, about 2.80:1, about 2.82:1, about 2.84:1, about 2.86:1, about 2.88:1, about 2.90:1, about 2.92:1, about 2.94:1, about 2.96:1, about 2.98:1, or at least about 3.00:1.

The weight ratio of the total amount of solid detergent composition to the total amount of gel detergent composition plus the total amount of liquid detergent composition may be no more than about 1.38:1, about 1.40:1, about 1.45:1, about 1.50:1, about 1.55:1, about 1.60:1, about 1.65:1, about 1.70:1, about 1.75:1, about 1.80:1, about 1.85:1, about 1.90:1, about 1.95:1, about 2.00:1, about 2.05:1, about 2.10:1, about 2.15:1, about 2.20:1, about 2.25:1, about 2.30:1, about 2.35:1, about 2.40:1, about 2.45:1, about 2.50:1, about 2.55:1, about 2.58:1, about 2.60:1, about 2.61:1, about 2.62:1, about 2.64:1, about 2.66:1, about 2.68:1, about 2.72:1, about 2.74:1, about 2.76:1, about 2.78:1, about 2.80:1, about 2.82:1, about 2.84:1, about 2.86:1, about 2.88:1, about 2.90:1, about 2.92:1, about 2.94:1, about 2.96:1, about 2.98:1, or no more than about 3.00:1.

The total amount of gel detergent composition plus total amount of the liquid detergent composition may be present in an amount of no more than about 40 wt. %, about 38 wt. %, about 36 wt. %, about 34 wt. %, about 32 wt. %, about 30 wt. %, about 28 wt. %, about 26 wt. %, about 24 wt. %, about 22 wt. %, or no more than about 20 wt. %, based on the total weight of the package.

The total amount of gel detergent composition plus the total amount of liquid detergent composition may be present in an amount of at least about 10 wt. %, about 12 wt. %, about 14 wt. %, about 16 wt. %, about 18 wt. %, about 20 wt. %, about 22 wt. %, about 24 wt. %, about 26 wt. %, about 28 wt. %, about 30 wt. %, about 32 wt. %, about 34 wt. %, about 36 wt. %, about 38 wt. %, about 40 wt. %, about 42 wt. %, about 44 wt. %, about 46 wt. %, about 48 wt. %, or at least about 50 wt. %, based on the total weight of the package.

The total amount of liquid detergent composition may be present in an amount of no more than about 15 wt. %, about 14 wt. %, about 13 wt. %, about 12 wt. %, about 11.5 wt. %, abut 11.0 wt. %, about 10.5 wt. %, about 10.0 wt. %, about 9.5 wt. %, about 9.0 wt. %, about 8.5 wt. %, about 8.0 wt. %, about 7.5 wt. %, about 7.0 wt. %, about 6.5 wt. %, about 6.0 wt. %, about 5.5 wt. %, about 5.0 wt. %, about 4.8 wt. %, about 4.6 wt. %, about 4.4 wt. %, about 4.2 wt. %, about 4.0 wt. %, wt. %, out 3.8 wt. %, about 3.6 wt. %, about 3.4 wt. %, about 3.2 wt. %, about 3.0 wt. %, about 2.8 wt. %, about 2.6 wt. %, about 2.4 wt. %, about 2.2 wt. %, about 2.0 wt. %, about 1.8 wt. %, about 1.6 wt. %, about 1.4 wt. %, about 1.2 wt. %, about 1.0 wt. %, about 0.8 wt. %, or no more than about 0.6 wt. %, based on the total weight of the package.

The total amount of liquid detergent composition may be present in an amount of at least about 0.6 wt. %, about 0.8 wt. %, about 1.0 wt. %, about 1.2 wt. %, about 1.4 wt. %, about 1.6 wt. %, about 1.8 wt. %, about 2.0 wt. %, about 2.2 wt. %, about 2.4 wt. %, about 2.6 wt. %, about 2.8 wt. %, about 3.0 wt. %, about 3.2 wt. %, about 3.4 wt. %, about 3.6 wt. %, about 3.8 wt. %, about 4.0 wt. %, about 4.2 wt. %, about 4.4 wt. %, about 4.6 wt. %, about 4.8 wt. %, about 5.0 wt. %, about 5.5 wt. %, about 6.0 wt. %, about 6.5 wt. %, about 7.0 wt. %, about 7.5 wt. %, about 8.0 wt. %, about 8.5 wt. %, about 9.0 wt. %, about 9.5 wt. %, about 10.0 wt. %, about 10.5 wt. %, about 11.0 wt. %, about 11.5 wt. %, about 12.0 wt. %, about 12.5 wt. %, about 13.0 wt. %, about 13.5 wt. %, about 14.0 wt. %, about 14.5 wt. %, or at least about 15.0 wt. %, based on the total weight of the package.

The package may be a water-soluble package.

By the term 'water-soluble package' as used herein, it is meant a package which at least partially dissolves in water or disperses in water at 20° C. within 10 minutes to allow for egress of the contents of the package into the surrounding water.

The water-soluble package may be formed of a water-soluble film. The water-soluble film may be rigid or flexible at room temperature.

The water-soluble package may comprise or may be made of a poly(vinyl alcohol) (PVOH) film. The PVOH film may be partially or fully alcoholised or hydrolysed, for example, it may be from 40 to 100%, preferably 70 to 92%, most preferably about 85% to about 92%, alcoholised or hydrolysed, polyvinyl acetate film. The degree of hydrolysis is known to influence the temperature at which the PVOH starts to dissolve in water. 88% hydrolysis corresponds to a film soluble in cold (i.e. room temperature) water, whereas 92% hydrolysis corresponds to a film soluble in warm water. The film may be cast, blown or extruded. It may further be unoriented, mono-axially oriented or bi-axially oriented.

The PVOH film may be a thermoformed PVOH film.

The package may comprise a first PVOH film comprising a pocket and a surrounding flange, and a second PVOH film, applied as a cover across the pocket and sealed across the flange. The package may comprise a first PVOH film comprising more than one pocket, for example a number of pockets selected from the group comprising two or more, three or more, four or more, five or more, or six or more pockets, and a surrounding flange, and a second PVOH film, applied as a cover across each pocket and sealed across the flange. In some embodiments there are three or four pockets.

The package may be in a unit-dose format.

By 'unit-dose', it is meant that the package comprises at least one solid detergent composition and at least one gel detergent composition, together in the quantity required for a single wash cycle of a machine dishwasher. In some embodiments the unit dose format also includes a liquid detergent composition.

The package may be in the form of a unit-dose format for a single use. In case of a dose for a single wash cycle, the package of the present invention may contain at least about 1 g, about 2 g, about 3 g, about 4 g, about 5 g, about 6 g, about 7 g, about 8 g, about 9 g, about 10 g, about 11 g, about 12 g, about 13 g, about 14 g, about 15 g, about 16 g, about 17 g, about 18 g, about 19 g, or at least about 20 g, of the at least one solid detergent composition, such as from about 1 to about 50 g, from about 2 to about 30 g, from about 4 g to about 20 g, from about 6 g to about 15 g, from about 8 g to about 12 g, or about 10 g. Other ingredients may be used as fillers to reach the intended amount. These fillers may be as described hereinabove, and may be powders such as those selected from the list comprising sodium sulphates, crystals like sugar, liquids like water or other liquids, and the like. Further auxiliary ingredients such as fragrance or dyes can also be used in such a single wash dose.

In embodiments of the invention comprising at least one liquid detergent composition, the total amount of liquid detergent composition may be present in the package in an amount of at least about 0.05 g, about 0.10 g, about 0.15 g, about 0.20 g, about 0.25 g, about 0.30 g, about 0.35 g, about 0.40 g, about 0.45 g, or at least about 0.50 g. The total amount of liquid detergent composition may be present in the package in an amount of no more than about 0.60 g, about 0.55 g, about 0.50 g, about 0.45 g, about 0.40 g, about 0.35 g, about 0.30 g, about 0.25 g, about 0.20 g, about 0.15 g, or no more than about 0.10 g.

The package may comprise a multi-cycles device; that is, the device may be structured to release the detergent compositions comprised in the package of the invention across multiple cycles of washing, and may either be added to a dishwasher and left for multiple cycles or may be removed and replaced for each cycle. The multi-cycles device may comprise a plurality of doses of the at least one solid detergent composition and the at least one gel detergent composition of the package of the invention. The plurality of doses may be arranged to release one dose at any defined time period, such as once every wash cycles, once every stage in every wash cycle or at two or more stages in every wash cycle, for example.

In embodiments of the invention comprising at least one liquid detergent composition, the at least one liquid detergent composition may comprise at least one cleaning active selected from the group comprising a builder, co-builder, surfactant, alkalinity source, acidity source, enzyme, polymer, anti-corrosion agent, bleaching agent, perfume, colourant or care agent, or a mixture thereof.

The at least one liquid detergent composition may comprise a surfactant in an amount of at least about 50 wt. %, about 55 wt. %, about 60 wt. %, about 65 wt. %, about 70 wt. %, about 75 wt. %, about 80 wt. %, about 85 wt. %, about 90 wt. %, about 92 wt. %, about 94 wt. %, about 96 wt. %, about 97 wt. %, about 98 wt. %, or at least about 99 wt. %, based on the total weight of the at least one liquid detergent composition.

The package according to the invention may comprise at least one further composition selected from the group comprising a rinse aid composition or an additive composition. In some embodiments comprising a package in the form of a multi-compartment package, the rinse aid composition and/or the additive composition may be located in a separate compartment to that of the at least one solid detergent composition and/or the at least one gel detergent composition.

In general, the maximum dimension of the filled part of the package (excluding any flanges) may be about 10 cm or about 8.0 cm. For example, a substantially square based package may have a length of about 1.0 to about 8.0 cm, for example about 2.0 to about 6.0 cm, about 3.5 to about 4.8 cm, about 4.8 cm or about 4.1 cm, a width of about 1.5 to about 4 cm, for example about 3 to about 4 cm, about 3.7 cm or about 3.9 cm, and a height of about 1 to about 2.5 cm, for example about 1 to about 2 cm, or about 1.25 to about 1.75 cm.

In general, in embodiments comprising a package in the form of a multi-compartment package, the maximum dimension of each compartment (excluding any flanges) may be about 8.0 cm, about 6.0 cm, about 5.0 cm, about 4.0 cm, about 3.0. cm, about 2.0 cm, about 1.0 cm or about 0.5 cm. For example, a rounded cuboid compartment may have a length of about 1 to about 5.0 cm, for example about 3.5 to about 4.5 cm, a width of about 1.5 to about 3.5 cm, for example about 2.0 to about 3.0 cm, and a height of about 1.0 to about 2.5 cm, for example about 1.0 to about 2.0 cm, or about 1.25 to about 1.75 cm.

According to a second aspect of the invention, there is provided the use of a package according to the first aspect, for washing soiled kitchenware.

The kitchenware may comprise tableware, such as, for example, crockery, cutlery, and the like.

The kitchenware may comprise elements made of glass, such as, for example, glass vessels, beakers, containers, jars, and the like.

The invention according to the second aspect may optionally include any of the features of the invention according to the first aspect.

According to a third aspect of the invention, there is provided a method for washing kitchenware in an automatic dishwashing machine, wherein the package according to the first aspect of the invention is added to the automatic dishwashing machine.

The package according to the first aspect may be added to the automatic dishwashing machine at the start of a main wash cycle or at the start of a pre-wash cycle. The package according to the first aspect may be added to a dosing basket or a dosing chamber within the automatic dishwashing machine. The package according to the first aspect may be placed on a floor of the automatic dishwashing machine.

The package according to the first aspect may comprise a dosing format which releases the at least one solid detergent composition and the at least one gel detergent composition over a plurality of stages of a dishwashing cycle or over at least one stage of a plurality of dishwashing cycles. In embodiments of the first aspect of the invention comprising at least one liquid detergent composition, the at least one liquid detergent composition may be released over a plurality of stages of a dishwashing cycle or over at least one stage of a plurality of dishwashing cycles.

The invention according to the third aspect may optionally include any of the optional features of the invention according to the first aspect or the second aspect.

One or more of the following cleaning active categories may be present in the at least one detergent composition in the form of a solid or the at least one detergent composition in the form of a gel, or, in embodiments comprising such, in the at least one detergent composition in the form of a liquid, or in any detergent composition located in any compartment of a multi-compartment package of the invention, as desired. More than one ingredient from each cleaning active category may be present, if a cleaning active category is present in the package of the invention.

Cleaning Actives

If the inventive composition may be used as part of a dishwashing detergent, it can be used in combination with their state of the art ingredients. Those skilled in the art will appreciate that where the term "detergent" is used herein, this does also include rinse aid and any other additive composition used to be applied during dishwashing in a dishwasher. The package may comprise at least one active component which may be selected from the group comprising surfactants, alkalinity sources, acidity sources (especially for rinse aid and machine cleaner), builders, enzymes, polymers, anti-corrosion agents, bleach, care agents and other auxiliary ingredients like fragrance, dye, etc. The at least one active component may be comprised in the at least one solid detergent composition and/or the at least one gel detergent composition. In embodiments comprising at least one liquid detergent composition, the at least one active component may be comprised in the at least one liquid detergent composition.

Builder

The package may comprise any ingredients known in the art. The package may comprise a builder. The builder may be either a phosphate-containing builder or a phosphate-free builder, or a mixture of each, as desired. In many countries, including the United States and in the European Union, phosphate builders are restricted and so phosphate-free builders are preferred. The package may comprise a secondary builder (co-builder).

The phosphate-free builder may also or alternatively comprise non-polymeric organic molecules with one or more carboxylic group(s). Builder compounds which are organic molecules comprising carboxylic groups may include at least one selected from the group comprising citric acid, fumaric acid, tartaric acid, maleic acid, lactic acid and salts thereof. The alkali or alkaline earth metal salts of these organic compounds may be used, in particular, but not limited to, the sodium salts. The phosphate-free builder may be at least one selected from the group comprising sodium citrate, citrate trisodium, trisodium citrate dihydrate, or mixtures thereof.

The phosphate-free co-builder may be at least one polycarboxylate(s) which comprise two carboxyl groups selected from the group comprising water-soluble salts of malonic acid, (ethylenedioxy)diacetic acid, maleic acid, diglycolic acid, tartaric acid, tartronic acid and fumaric acid. The phosphate-free co-builder may be at least one polycarboxylate(s) which comprise three carboxyl groups, for example, water-soluble citrate. The phosphate-free co-builder may be at least one hydroxycarboxylic acid, for example, citric acid.

If phosphate-containing builders are to be used, the phosphate-containing builder may be at least one phosphate-containing builder selected from the group comprising monophosphates, di-phosphates, tri-polyphosphates or oligomeric-poylphosphates, or its alkali metal salt, in particular, but not limited to, its sodium salt, for example sodium tripolyphosphate (STPP).

Conventional amounts of the phosphate-containing builders may be used, typically in the range of from about 15% by weight to about 70% by weight, or from about 20% by weight to about 60% by weight, or from about 25% by weight to about 50% by weight. If additional phosphate-free builder is included, the phosphate-free builder may be chosen from succinate based compounds. It is intended that the term 'succinate based compound' includes succinic acid based compounds, and such terms may be used interchangeably herein. Conventional amounts of the succinate based compounds may be used, typically in the range of from about 5% by weight to about 80% by weight, or from about 15% by weight to about 70% by weight, or from about 20% by weight to about 60% by weight. The compounds may be used individually or as a mixture.

The package may include at least one suitable builder selected from the list comprising glutamic acid N,N-diacetic acid (GLDA), methylglycinediacetic acid (MGDA). aspartic acid-N-monoacetic acid (ASMA), aspartic acid-N,N-diacetic acid (ASDA), aspartic acid-N-monopropionic acid (ASMP), iminodisuccinic acid (IDA), N-(2-sulfomethyl) aspartic acid (SMAS), N-(2-sulfoethyl)aspartic acid (SEAS), N-(2-sulfomethyl)glutamic acid (SMGL), N-(2-sulfoethyl)glutamic acid (SEGL), N-methyliminodiacetic acid (MIDA), a-alanine-N,N-diacetic acid (a-ALDA), β-alanine-N,N-diacetic acid (β-ALDA), serine-N,N-diacetic acid (SEDA), isoserine-N,N-diacetic acid (ISDA), phenylalanine-N,N-diacetic acid (PHDA), anthranilic acid-N, N-diacetic acid (ANDA), sulfanilic acid-N, N-diacetic acid (SLDA), taurine-N, N-diacetic acid (TUDA) and sulfomethyl-N, N-diacetic acid (SMDA), tetrasodium imminosuccinate, iminodisuccinic acid (IDS) and (hydroxy)iminodisuccinic acid (HIDS) and alkali metal salts or ammonium salts thereof, or mixtures thereof.

The builder may comprise at least one homopolymer or copolymer selected from the group comprising homopolymers and copolymers of polycarboxylic acids and their partially or completely neutralised salts, monomeric polycarboxylic acids and hydroxycarboxylic acids and their salts, phosphates and phosphonates, and mixtures thereof. The salts of the abovementioned compounds may be selected from the group comprising the ammonium and/or alkali metal salts, i.e. the lithium, sodium, or potassium salt.

The builder may be an organic builder.

The total amount of builder present in the package may be at least about 5% by weight, at least about 10% by weight, at least about 15% by weight, at least about 20% by weight, at least about 25% by weight, at least about 30% by weight, at least about 35% by weight, at least about 40% by weight, at least about 45% by weight, or at least about 50% by weight.

The total amount of builder present in the package may be in an amount of up to about 80% by weight, up to about 70% by weight, up to about 60% by weight, up to about 50% by weight, or up to about 45% by weight. The actual amount used in the detergent composition may depend upon the nature of the builder used.

Surfactant

The package may include at least one surfactant. The at least one surfactant may be selected from the group comprising non-ionic, anionic, cationic, amphoteric or zwitterionic surface active agents, or suitable mixtures thereof. The non-ionic surfactant may be an ethoxylated non-ionic surfactant prepared by the reaction of a monohydroxy alkanol with about 6 to about 20 carbon atoms. The surfactant may have at least about 12 moles, at least about 16 moles, at least about 20 moles, or at least about 25 moles, of ethylene oxide per mole of alcohol. The non-ionic surfactant may be from a linear chain fatty alcohol with about 16 to about 20 carbon atoms and at least about 12 moles, at least about 16 moles, or at least about 20 moles of ethylene oxide per mole of alcohol.

The non-ionic surfactant may additionally comprise propylene oxide units in the surfactant molecule. The propylene oxide units may constitute up to about 25% by weight, up to about 20% by weight, or up to about 15% by weight of the overall molecular weight of the non-ionic surfactant.

The surfactant may be an ethoxylated mono-hydroxy alkanols which additionally comprise polyoxyethylene-polyoxypropylene block copolymer units. The alcohol portion of the ethoxylated mono-hydroxy alkanols may constitute more than about 30% by weight, more than about 50% by weight, or more than about 70% by weight of the overall molecular weight of the non-ionic surfactant. The non-ionic surfactant may comprise reverse block copolymers of polyoxyethylene and polyoxypropylene and block copolymers of polyoxyethylene and polyoxypropylene initiated with trimethylolpropane.

The non-ionic surfactant may be a surfactant described by the formula:

$$R^1O[CH_2CH(CH_3)O]X[CH_2CH_2O]Y[CH_2CH(OH)R^2]$$

where $R^1$ represents a linear or branched chain aliphatic hydrocarbon group with about 4 to about 18 carbon atoms or a mixture thereof, $R^2$ represents a linear or branched chain aliphatic hydrocarbon rest with about 2 to about 26 carbon atoms or a mixture thereof, x is a value between about 0.5 and about 1.5, and y is a value of at least about 15.

The non-ionic surfactant may be an end-capped polyoxyalkylated non-ionic surfactant of the formula:

$$R^1O[CH_2CH(R^3)O]X[CH_2]kCH(OH)[CH_2]jOR^2$$

where $R^1$ and $R^2$ represent linear or branched chain, saturated or unsaturated, aliphatic or aromatic hydrocarbon groups with about 1 to about 30 carbon atoms, $R^3$ represents a group selected from the group comprising a hydrogen atom or a methyl, ethyl, n-propyl, iso-propyl, n-butyl, 2-butyl or 2-methyl-2-butyl group, x is a value between about 1 and about 30, between about 1 and about 20, or between about 6 and about 15, and, k and j are values between about 1 and about 12, between about 1 and about 5, or k may be about 1 and j may be about 1. When the value of x is greater than about 2, each $R^3$ in the formula above may be different. $R^1$ and $R^2$ may be linear or branched chains, saturated or unsaturated, aliphatic or aromatic hydrocarbon groups with about 6 to about 22 carbon atoms, or about 8 to about 18 carbon atoms.

As described above, where the value of x is greater than about 2, each $R^3$ in the formula can be different. For example, when x=3, $R^3$ may be ethylene oxide (EO) ($R^3$=H) or propylene oxide (PO)=methyl) units which can be used in any order, for example an order selected from the group comprising (PO)(EO)(EO), (EO)(PO)(EO), (EO)(EO)(PO), (EO)(EO)(EO), (PO)(EO)(PO), (PO)(PO)(EO) and (PO)(PO)(PO).

The package may comprise a non-ionic surfactant comprising a mixture of alkoxylated alcohols and hydroxy-group containing alkoxylated alcohols.

The package may comprise a non-ionic surfactant in an amount of from about 0.1% by weight to about 20% by weight, about 1% by weight to about 15% by weight, or about 2% to about 10% by weight, based on the total weight of the detergent composition.

Enzyme

The package may comprise at least one enzyme. The at least one enzyme may be selected from the group comprising protease, lipase, amylase, cellulase and peroxidase, or mixtures thereof. Advantageously, enzymes, in particular, but not limited to, protease and amylase, provide favourable cleaning efficacy in dishwashing detergent compositions. Any suitable species of these enzymes may be used as desired. More than one species may be used.

The package may comprise at least about 0.001 mg, at least about 0.01 mg, or at least about 0.1 mg of active enzyme per gram of package.

The package may comprise from about 1.5 to about 10 mg, from about 1.8 to about 5 mg, or from about 2 to about 4 mg of active enzyme per gram of package.

Bleach

The package may comprise at least one bleach additive or bleach activation catalyst. The at least one bleach additive or bleach activation catalyst may be selected from the group comprising an organic peracid, for example perbenzoic acid and peroxycarboxylic acids e.g. phthalimido peroxy caproic acid (PAP). Advantageously, organic peracids do not require the use of a bleach activator or catalyst as these bleaches are active at relatively low temperatures, for example at about 30° C. and this contributes to such bleach materials being preferred according to the present invention.

The package may comprise one or more bleaching agents. The one or more bleaching agents may be selected from the group comprising a percarbonate, for example coated sodium percarbonate or uncoated sodium percarbonate, and peroxycarboxylic acids e.g. phthalimido peroxy caproic acid (PAP).

The package may comprise one or more bleach activator. The one or more bleach activator may be tetraacetylethylenediamine (TAED), Sodium nonanoyloxybenzenesulfonate (NOBS) or sodium decanoyloxybenzene sulfonic acid (DOBS).

The package may comprise one or more bleach catalyst. The one or more bleach catalyst may be a manganese complex comprising triazacyclononane (TACN), or any derivatives of a TACN ligand, for example 1,4,7-trimethyl-TACN, or manganese oxalate, manganese acetate or a dinuclear manganese complex, for example a dinuclear manganese complex comprising TACN or any derivatives of a TACN ligand, for example 1,4,7-trimethyl-TACN, or mixtures thereof.

The package may comprise one or more bleach activator or bleach catalyst, dependent on the nature of the bleaching compound. The bleach activator may be Tetraacetylethylenediamine (TAED). The bleach catalyst may be selected from the group comprising manganese oxalate, manganese acetate, manganese sulphate, or a manganese salt thereof, or a dinuclear manganese complex.

The package may comprise water.

Acidity and Alkalinity

The package may comprise a source of acidity or a source of alkalinity, to obtain the desired pH on dissolution. A source of acidity may be any acidic compound, for example a polycarboxylic acid, for example citric acid. A source of alkalinity may be selected from the group comprising a carbonate or bicarbonate (such as an alkali metal or alkaline earth metal salt). A source of alkalinity may be any basic compound, for example any salt of a strong base and a weak acid. An alkalinity source may be selected from the group comprising an alkali hydroxide, alkali hydride, alkali oxide, alkali sesquicarbonate, alkali carbonate, alkali borate, alkali salt of mineral acid, alkali amine, alkaloid, or mixtures thereof. The alkalinity source may be selected from the group comprising sodium carbonate, sodium hydroxide or potassium hydroxide. The source of alkalinity may be present in an amount sufficient to give the wash liquor a pH of from about 8 to about 12, preferably from about 9 to about 11.5. The package may comprise from about 1% to about 40%, or from about 2% to about 20% by weight of the composition, of a source of alkalinity.

The source of alkalinity may comprise a source of univalent ions. Beneficially, univalent ions contribute to high alkalinity and, advantageously, only minimally raise the ionic strength of the wash solution. The alkalinity source may be a metal hydroxide, for example, selected from the group comprising sodium hydroxide or potassium hydroxide.

Anti-Corrosion Agent

The package may comprise one or more anti-corrosion agent(s). Anti-corrosion agents may provide benefits against corrosion of glass and/or metal and the term encompasses agents that are intended to prevent or reduce the tarnishing of non-ferrous metals, in particular of silver and copper.

The package may comprise at least one multivalent ion. The at least one multivalent ion may be selected from the group comprising zinc, bismuth and/or manganese ions. Beneficially, these multivalent ions may inhibit corrosion of glass and/or metal.

The package may comprise polymers for inhibit corrosion of glass and/or metal like polyalkylenimmines and/or polyquats.

The package may comprise organic and inorganic redox-active substances which are known as suitable for use as silver/copper corrosion inhibitors. The inorganic redox-active substances may be at least one metal salt and/or metal complex selected from the group comprising zinc, bismuth, manganese, titanium, zirconium, hafnium, vanadium, cobalt and cerium salts and/or complexes thereof, the metals being in one of the oxidation states II, III, IV, V or VI. The at least one metal salt and/or metal complex may be selected from the group comprising of $MnSO_4$, Mn(ll) citrate, Mn(ll) stearate, Mn(ll) acetylacetonate, Mn(ll) [1-hydroxyethane-1, 1-diphosphonate], $V_2O_5$, $V_2O$, $VO_2$, $TiOSO_4$, $K_2TiF_6$, $K_2ZrF_6$, $CoSO_4$, $Co(NO_3)_2$, zinc acetate, zinc sulphate and $Ce(NO_3)_2$. The source of multivalent ions may be selected from the group comprising sulphates, carbonates, acetates, gluconates and metal-protein compounds.

The package may comprise at least one silver/copper anti-corrosion agent. The at least one silver/copper anti-corrosion agent may be selected from the group comprising benzotriazole (BTA) or bis-benzotriazole, or substituted derivatives thereof, for example tolyltriazole. Benzotriazole derivatives are those compounds in which the available substitution sites on the aromatic ring are partially or completely substituted, for example linear or branch-chain Ci-20 alkyl groups and hydroxyl, thio, phenyl or halogen such as fluorine, chlorine, bromine and iodine.

The package may comprise an anti-corrosion agent in an amount of from about 0.01% by weight to about 5% by weight, about 0.05% by weight to about 3% by weight, about 0.1% by weight to about 2.5% by weight, or about 0.2% by weight to about 2% by weight, based on the total weight.

Polymer

The package may comprise one or more polymer(s). Beneficially, one or more polymer(s) may improve the cleaning performance of the detergent composition. The polymer may be a sulphonated polymer. The polymer may be a copolymer. The copolymer may be a copolymer of $CH_2{=}CR^1{-}CR^2R^3{-}O{-}C_4H_3R^4{-}SO_3X$ where $R^1$, $R^2$, $R^3$ and $R^4$ are independently about 1 to about 6 carbon alkyl or hydrogen, and X is hydrogen or alkali with any suitable other monomer units selected from the group comprising modified acrylic, fumaric, maleic, itaconic, aconitic, mesaconic, citraconic and methylenemalonic acid or their salts, maleic anhydride, acrylamide, alkylene, vinylmethyl ether, styrene, or mixtures thereof.

The (co)polymer may include sulphonated monomer units. The sulphonated monomer units may be selected from the group comprising 2-acrylamido-2-methyl-1-propanesulphonic acid, 2-methacrylamido-2-methyl-1-propanesulphonic acid, 3-methacrylamido-2-hydroxy-propanesulphonic acid, allysulphonic acid, methallysulphonic acid, 2-hydroxy-3-(2-propenyloxy)propanesulphonic acid, 2-methyl-2-propenen-1-sulphonic acid, styrenesulphonic acid, vinyl sulphonic acid, 3-sulphopropyl acrylate, 3-sulphopropylmethacrylate, sulphomethylacrylamide, sulphomethylmethacrylamide and water soluble salts thereof, or mixtures thereof.

The package may comprise a sulphonated polymer in an amount of at least about 0.1% by weight, at least about 0.5% by weight, at least about 1% by weight, at least about 3% by weight, or up to about 40% by weight, up to about 25% by weight, up to about 15% by weight, or up to about 10% by weight.

Foam Control Agent

The package may comprise one or more foam control agent(s). The one or more foam control agent(s) may be any conventionally used in this field, for example selected from the group comprising silicones and their derivatives, or paraffin oil, or mixtures thereof. The foam control agent may be present in an amount of about 0.5% by weight or less.

Preservative

The detergent composition may comprise minor, conventional, amounts of one or more preservative(s).

Auxiliary

The detergent composition may comprise auxiliary ingredients like e.g. fragrance, dye.

EXAMPLES

Example 1—Stain-Cleaning Performance

Two compositions, Comparative Formulation (1) and Inventive Formulation (1), which each comprised a multi-compartment package comprising a detergent composition in the form of a solid, a detergent composition in the form of a gel and a detergent composition in the form of a liquid, were prepared according to the following formulations:

Comparative Formulation (1):

| Function | Ingredient | Solid 7.8 g 55.4 wt. % | Gel 5.2 g 36.9 wt. % | Liquid 0.5 g 3.5 wt. % | Poly(vinyl alcohol) (PVOH) Water-Soluble Film 0.6 g 4.2 wt. % |
|---|---|---|---|---|---|
| Builder (wt. %) | Trisodium Citrate | | 42.9 | | |
| Co-Builder (wt. %) | Phosphonate (HEDP) | 11.6 | | | |
| Alkali (wt. %) | Sodium Carbonate and Sodium Bicarbonate | 41.8 | | | |
| Bleach System (wt. %) | Bleach Actives | 27.0 | 14.3 | | |
| Polymer (wt. %) | Polycarboxylate Homo- and Co-Polymers | 12.0 | | | |
| Enzyme (wt. %) | Granular Protease | 4.7 | | | |
| | Granular Amylase | 2.3 | | | |
| Surfactant (wt. %) | FattyAlcohol Alkoxylate (EO/PO) | | 32.0 | 99.9 | |
| Perfume (wt. %) | | 0.5 | | | |

-continued

| Function | Ingredient | Solid 7.8 g 55.4 wt. % | Gel 5.2 g 36.9 wt. % | Liquid 0.5 g 3.5 wt. % | Poly(vinyl alcohol) (PVOH) Water-Soluble Film 0.6 g 4.2 wt. % |
|---|---|---|---|---|---|
| Colourant (wt. %) | Blue Colourant | | 0.1 | | |
| | Red Colourant | | | 0.1 | |
| Auxiliary (wt. %) | Polyglycol Thickening Agent | | 10.0 | | |
| | Silver Corrosion Protection Agent (e.g. Benzotriazole) | | 0.5 | | |
| | Glass Protection Agent (e.g. Nitrogen-Containing Polymer or Zinc Salt) | 0.1 | | | |
| | Anti-Foaming Agent | | 0.2 | | |
| PVOH Water soluble film (wt. %) | | | | | 100.0 |

Inventive Formulation (1):

| Function | Ingredient | Solid 9.9 g 69.6 wt. % | Gel 3.5 g 24.6 wt. % | Liquid 0.3 g 2.1 wt. % | Poly(vinyl alcohol) (PVOH) Water-Soluble Film 0.5 g 3.7 wt. % |
|---|---|---|---|---|---|
| Builder (wt. %) | Trisodium Citrate | 8.2 | 42.8 | | |
| Co-Builder (wt. %) | Phosphonate (HEDP) | 13.2 | | | |
| Alkali (wt. %) | Sodium Carbonate | 33.2 | | | |
| Bleach System (wt. %) | Bleach Actives | 27.0 | 14.4 | | |
| Polymer (wt. %) | Polycarboxylate Homo- and Co-Polymers | 12.3 | | | |
| Enzyme (wt. %) | Granular Protease | 3.7 | | | |
| | Granular Amylase | 1.8 | | | |
| Surfactant (wt. %) | Fatty Alcohol Alkoxylate (EO/PO) | | 32.0 | 99.9 | |
| Perfume (wt. %) | | 0.5 | | | |
| Colourant (wt. %) | Blue Colourant | | 0.1 | | |
| | Red Colourant | | | 0.1 | |
| Auxiliary (wt. %) | Polyglycol Thickening Agent | | 10.0 | | |
| | Silver Corrosion Protection Agent (e.g. Benzotriazole) | | 0.5 | | |
| | Glass Protection Agent (e.g. Nitrogen-Containing Polymer or Zinc Salt) | 0.1 | | | |
| | Anti-Foaming Agent | | 0.2 | | |
| PVOH Water-Soluble Film (wt. %) | | | | | 100.0 |

-continued

| | Total Formulation Weight (including film) (g) | Ratio of Solid to Gel (g/g) | Ratio of Solid to Gel Plus Liquid (g/g) |
|---|---|---|---|
| Comparative Formulation (1) | 14.1 | 7.80/ 5.20 = 1.5 | 7.80/ 5.70 = 1.37 |
| Inventive Formulation (1) | 14.2 | 9.90/ 3.50 = 2.83 | 9.90/ 3.80 = 2.61 |

Each of Comparative Formulation (1) and Inventive Formulation (1) were in the form of a multi-compartment package comprising three separate compartments. Each of Comparative Formulation (1) and Inventive Formulation (1) comprised a first compartment comprising the solid detergent composition, a second compartment comprising the gel detergent composition and a third compartment comprising the liquid detergent composition. The associated weights and compositions of the solid, gel and liquid detergent compositions is provided above.

The solid detergent composition in each of Comparative Formulation (1) and Inventive Formulation (1) was in the form of a compressed powdered solid.

Inventive Formulation (1) comprised a package having a weight ratio of the solid detergent composition to the gel detergent composition of 2.83:1.

Inventive Formulation (1) comprised a package having a weight ratio of the solid detergent composition to the gel detergent composition plus the liquid detergent composition of 2.61:1.

Comparative Formulation (1) comprised a package having a weight ratio of the solid detergent composition to the gel detergent composition of 1.50:1.

Comparative Formulation (1) comprised a package having a weight ratio of the solid detergent composition to the gel detergent composition plus the liquid detergent composition of 1.37:1.

Each multi-compartment package was a water-soluble package made of PVOH.

Inventive Formulation (1) and Comparative Formulation (1) were prepared and each placed in separate stain-cleaning performance trials according to the following:

| | |
|---|---|
| Machine Type | Bosch |
| Program | 1 hour; 65° C. |
| Water Hardness | 21° GH (375 ppm) |
| Evaluation | after 4 dishwashing cycles |

Scoring: 10.0=Most Clean; 1.0=Least Clean. A difference of <1.0 between cleaning performance scores was not considered significant.

Stains were prepared according to IKW protocol, 'Recommendations for the Quality Assessment of the Cleaning Performance of Dishwasher Detergents (Part B, Update 2015)', German Cosmetic, Toiletry, Perfumery and Detergent Association (IKW)—Working Group Automatic Dishwashing Detergents, *sofw journal* June 2016, 142, 34-48.

| | Crème Brulée | Milk Skin | Minced Meat | Pasta | Tea | Tea with Milk | Starch Mix | Egg Yolk |
|---|---|---|---|---|---|---|---|---|
| Comparative Formulation (1) | 10.0 | 10.0 | 9.5 | 9.1 | 6.7 | 10.0 | 10.0 | 9.8 |
| Inventive Formulation (1) | 10.0 | 10.0 | 9.9 | 9.1 | 9.5 | 10.0 | 9.9 | 9.8 |

Notably, in each trial, Inventive Formulation (1) shows superior stain-cleaning performance compared to Comparative Formulation (1). In particular, Inventive Formulation (1) shows a considerable improvement with respect to tea-stain cleaning performance compared to Comparative Formulation (1).

This shows that providing a package according to Inventive Formulation (1), i.e. comprising a weight ratio of solid detergent composition to gel detergent composition of 2.83:1, i.e. between about 1.60:1 and about 3.00:1, provides superior, cleaning performance compared to a package according to Comparative Formulation (1), i.e. comprising a weight ratio of solid detergent composition to gel detergent composition of 1.50:1.

Surprisingly, Inventive Formulation (1) provides a superior cleaning performance compared to Comparative Formulation (1) because of an optimisation of the weight ratio of the solid and gel detergent compositions, and not, for example, by using significant quantities of additional cleaning actives or novel chemical compounds which are not present in Comparative Formulation (1).

Example 2—Shine Performance

The test was carried out using ballast soil to simulate soiled kitchenware. A beaker with 16 g defrosted soil was placed in a top basket of the dishwasher at the beginning of each test.

| | |
|---|---|
| Machine Type | Bosch |
| Program | Eco |
| Water Hardness | 21° GH |
| Evaluation | After 5 washing cycles |

| | Parameter | Comparative Formulation (1) | Inventive Formulation (1) |
|---|---|---|---|
| Short term shine (5 | Glass spotting | 2.0 | 2.1 |
| | Glass filming | 3.3 | 3.1 |

-continued

| | | | |
|---|---|---|---|
| cycles) | Cutlery spotting | 2.0 | 2.0 |
| | Cutlery filming | 3.0 | 2.0 |

1.0 - No spotting/filming
2.0 - Slight spotting/filming
3.0 - Strong spotting/filming
4.0 - Very strong spotting/filming
5.0 - Extremely strong spotting/filming
A difference of ≥1.0 score on filming was considered significant.
A difference of ≥0.5 score on spotting was considered significant.

Notably, in each trial, Inventive Formulation (1) shows superior shine performance compared to Comparative Formulation (1). In particular, Inventive Formulation (1) shows a considerable improvement with respect to cutlery filming compared to Comparative Formulation (1).

This shows that providing a package according to Inventive Formulation (1), i.e. comprising a weight ratio of solid detergent composition to gel detergent composition of 2.83:1, i.e. between about 1.60:1 and about 3.00:1, provides superior shine performance compared to a package according to Comparative Formulation (1), i.e. comprising a weight ratio of solid detergent composition to gel detergent composition of 1.50:1.

Surprisingly, Inventive Formulation (1) provides a superior shine performance compared to Comparative Formulation (1) because of an optimisation of the weight ratio of the solid and gel detergent compositions, and not, for example, by using significant quantities of additional cleaning actives or novel chemical compounds which are not present in Comparative Formulation (1).

The examples above show that Inventive Formulation (1), an example of a package according to the invention, results in a package with superior wash performance, that is cleaning performance and shine performance, compared to Comparative Formulation (1) which comprises a solid detergent composition and a gel detergent composition in a weight ratio less than 1.60:1.

The above embodiments are described by way of example only. Many variations are possible without departing from the scope of the invention as defined in the appended claims.

The invention claimed is:

1. A package for an automatic dishwashing cycle, the package comprising:
- at least one detergent composition in the form of a solid, wherein the solid detergent composition comprises at least about 20 wt % of at least one builder based on a total weight of the solid detergent composition, at least about 10 wt % of at least one bleaching agent based on the total weight of the solid detergent composition, and at least one enzyme; and
- at least one detergent composition in the form of a gel, wherein the gel detergent composition comprises at least about 25 wt % of at least one builder based on a total weight of the gel detergent composition; and
- wherein the weight ratio of the total amount of solid detergent composition to the total amount of gel detergent composition is between 2.00:1 and 3.00:1.

2. The package according to claim 1, wherein the package is a multi-compartment package comprising two or more separated compartments.

3. The package according to claim 2, wherein the multi-compartment package comprises at least a first compartment and a second compartment, further wherein the at least one solid detergent composition is located within the first compartment and the at least one gel detergent composition is located within the second compartment.

4. The package according to claim 3, wherein the multi-compartment package further comprises at least one detergent composition in the form of a liquid.

5. The package according to claim 4, wherein the multi-compartment package further comprises a third compartment, wherein the at least one liquid detergent composition is located within the third compartment.

6. The package according to claim 1, wherein the weight ratio of the total amount of the solid detergent composition to the total amount of the gel detergent composition plus the total amount of the liquid detergent composition is between 1.70:1.00 and 3.00:1.00.

7. The package according to claim 1, wherein the at least one solid detergent composition is present in an amount of at least 56 wt. %, based on the total weight of the package.

8. The package according to claim 1, wherein the at least one gel detergent composition is present in an amount of no more than 36 wt. %, based on the total weight of the package.

9. The package according to claim 4, wherein the at least one liquid detergent composition is present in an amount of no more than 3.4 wt. %, based on the total weight of the package.

10. The package according to claim 1, wherein the package is a water-soluble package.

11. The package according to claim 10, wherein the water-soluble package comprises or is a poly(vinyl alcohol).

12. The package according to claim 11, wherein the water-soluble package comprises a thermoformed poly(vinyl alcohol) film.

13. The package according to claim 10, wherein the water-soluble package is formed of a water-soluble film.

14. The package according to claim 13, wherein the water-soluble film is rigid or flexible at room temperature.

15. The package according to claim 1, wherein the package is in a unit-dose format.

16. A method of washing soiled kitchenware comprising contacting the kitchenware with the package according to claim 1.

17. A method of treating or washing kitchenware in an automatic dishwashing machine, wherein the package according to claim 1 is added to the automatic dishwashing machine.

18. The method of treating or washing kitchenware in an automatic dishwashing machine according to claim 17, wherein the package is added to the automatic dishwashing machine at the start of a main wash cycle or at the start of a pre-wash cycle.

19. The method of treating or washing kitchenware in an automatic dishwashing machine according to claim 17, wherein the package comprises a dosing format which releases the at least one solid detergent composition and the at least one gel detergent composition over a plurality of stages of a dishwashing cycle or over at least one stage of a plurality of dishwashing cycles.

20. The package of claim 1, wherein at least one of:
- the at least one builder of the solid detergent composition is selected from the group consisting of hydroxycarboxylates, aminocarboxylates, dicarboxylic acid amines, phosphates, phosphonates, salts thereof, and mixtures thereof;
- the at least one bleaching agent of the solid detergent composition is selected from the group consisting of a percarbonate, a manganese complex comprising triazacyclononane (TACN), or any derivatives of a TACN ligand, and mixtures thereof;

the at least one builder of the gel detergent composition is selected from the group consisting of hydroxycarboxylates, aminocarboxylates, dicarboxylic acid amines, phosphates, phosphonates, salts thereof, and mixtures thereof.

21. The package of claim 20, wherein at least one of:

the at least one builder of the solid detergent composition is selected from the group consisting of trisodium citrate, methyl glycine diacetic acid (MGDA), N,N-dicarboxymethyl glutamic acid (GLDA), iminodisuccinic acid (IDS), tripolyphosphate, phosphonate, salts thereof, and mixtures thereof;

the at least one bleaching agent of the solid detergent composition is selected from the group consisting of coated sodium percarbonate, uncoated sodium percarbonate, tetraacetylethylenediamine (TAED), 1,4,7-trimethyl-TACN, manganese oxalate, manganese acetate, a dinuclear manganese complex, a dinuclear manganese complex comprising TACN or any derivatives of a TACN ligand, and mixtures thereof; and the at least one builder of the gel detergent composition is selected from the group consisting of trisodium citrate, methyl glycine diacetic acid (MGDA), N,N-dicarboxymethyl glutamic acid (GLDA), iminodisuccinic acid (IDS), tripolyphosphate, phosphonate, salts thereof, and mixtures thereof.

22. The package of claim 1, wherein the at least one bleaching agent of the solid detergent composition is present in the form of a bleach system that comprises at least one bleaching agent, at least one bleach activator, and at least one bleach catalyst.

* * * * *